Jan. 2, 1951 T. HINDMARCH 2,536,549
TRANSMISSION GEAR

Filed Oct. 28, 1946 2 Sheets-Sheet 2

Inventor
T. Hindmarch
By Glascock Downing Seebold
Attys.

Patented Jan. 2, 1951

2,536,549

UNITED STATES PATENT OFFICE 2,536,549

TRANSMISSION GEAR

Thomas Hindmarch, London, England

Application October 28, 1946, Serial No. 706,278
In Great Britain October 9, 1945

4 Claims. (Cl. 74—377)

This invention relates to power transmission gears of the kind embodying one or more pressure fluid operated, magnetically operated, or other clutches or couplings for selecting the direction of drive.

In such gears as hitherto proposed or adopted it has been found necessary to use clutches of unduly large size in cases where the torque to be transmitted is relatively high and the object of my invention is to obviate this disadvantage of the known arrangements.

According to my invention, I divide the input torque or torques amongst a plurality of intermediate shafts with which the clutches or couplings are associated and all of which drive either directly or indirectly on to one or more final gears fixed on or driving the output shaft or shafts. The interconnecting gear wheels, clutches, shafts, etc. which are inherent in the power transmission to transmit the torque or torques from input to output shaft or shafts may be of any kind or design and the axes of the rotating shafts or any other members may be parallel or at any desired angle to one another.

It is further understood that my invention also provides for an arrangement wherein for one or the other direction of rotation and/or for one or more than one speed in either direction and in particular to take care of increased power torques, I arrange two or more clutches on one and the same shaft and on any number of shafts as may be desired in such a way that they operate in parallel, thus transmitting the increased power torque.

The invention also comprises a power transmission mechanism as hitherto described wherein by simple means and in particular whilst the transmission is running it is possible to isolate one or more than one train of gear wheels and/or shafts which is of a very considerable advantage in the case where the torque transmitted is for some reason or other (defective prime mover or movers) considerably below the normal and designed rating, thus eliminating all the frictional and other losses of the gear wheels and shafts thus isolated.

Further features of the invention will be apparent from the description given hereafter.

The accompanying drawings illustrate one convenient form of transmission in accordance with the invention.

Figure 3 is a section on the line 3—3 of Figure 1.

In carrying my invention into effect in one convenient manner I provide an input shaft $a$ to which is applied the torque to be transmitted, and within the gear-box or transmission unit I arrange two intermediate shafts $bc$ parallel with the input shaft and one upon each side thereof.

Fast on the input shaft $a$ are two gear pinions $a'a^2$ and upon each of the intermediate shafts I arrange one set of ahead gear wheels $b'c'$ associated with a suitable clutch $d$ and one set of astern gear wheels $b^2c^2$ with its clutch $e$ and with which the pinions on the input shaft gear respectively, the ahead pinions meshing directly and the astern pinions indirectly through the medium of the idlers $b^3c^3$. The intermediate shafts are extended so that each carries a further gear pinion $b^4c^4$ and these gear pinions mesh with a final gear wheel $f$ upon the output shaft $g$. The arrangement is such that if the ahead clutches are selected for operation the output shaft is driven in the ahead direction by both intermediate shafts while if the reverse clutches are selected for operation the output shaft is driven in the reverse direction.

It is of course understood that my invention is not limited to the foregoing arrangement as I can also incorporate for either the ahead or the astern or for both directions of rotation more than one speed as may be required.

Any suitable form of clutch may be adopted in accordance with the invention but I prefer to employ pressure fluid operated clutches or couplings such as $d$ and $e$ which are controlled for operation by a suitable valve or valves (not shown) in the normal way, and the control mechanism may be so adapted that all the ahead clutches which are engaged for the same speed or all the astern clutches which are engaged for the same speed are operative at one time or all the clutches remain in neutral.

Alternatively, in one and the same transmission I may use clutches of various types, as for instance, together with pressure fluid operated clutches I may use one or more magnetic clutches or couplings or vice versa in which case the control valve or valves may be a combination of pressure fluid valves and electrically controlled valves.

Figure 1:
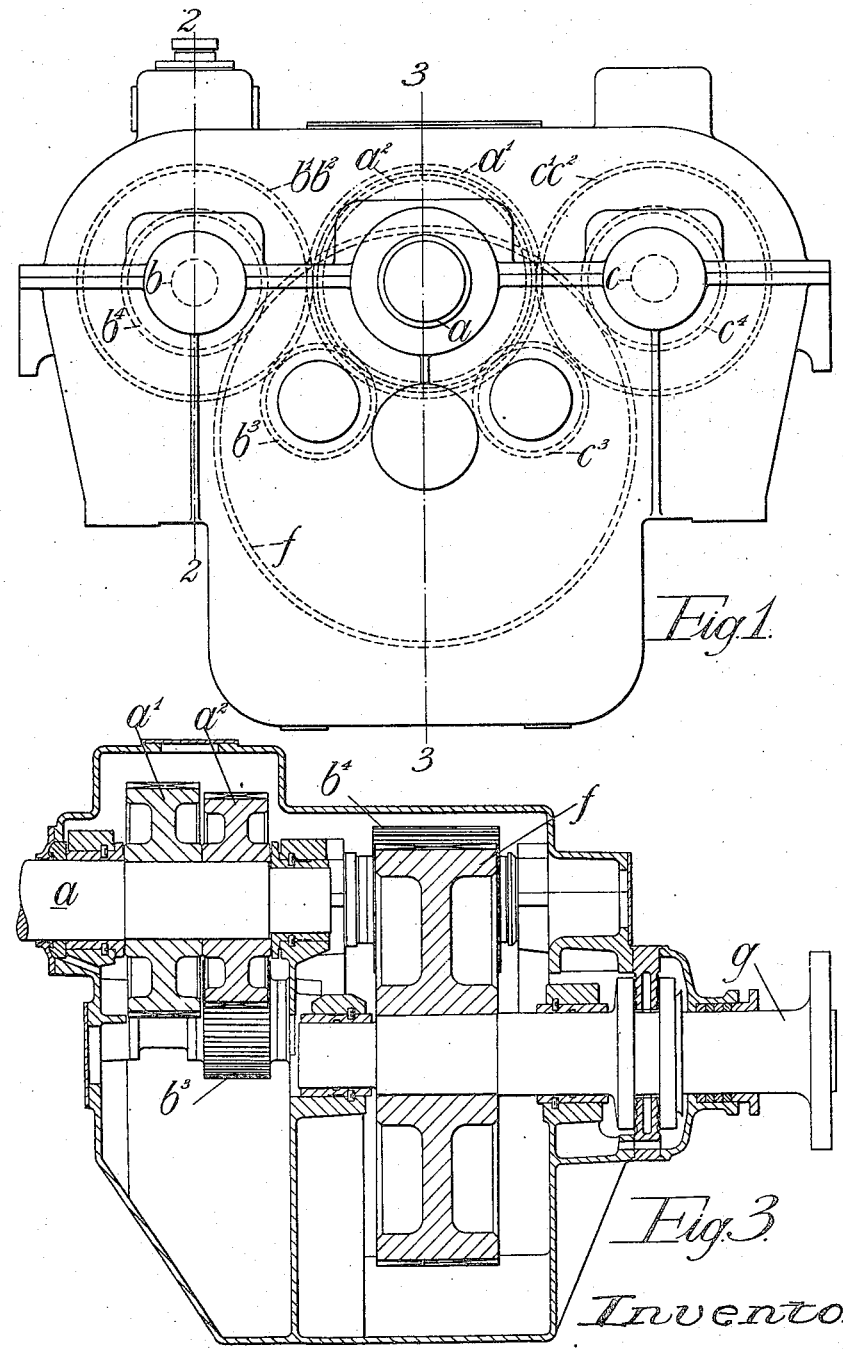
Figure 1 is an end elevation showing the location of the various shafts.
Figure 2:
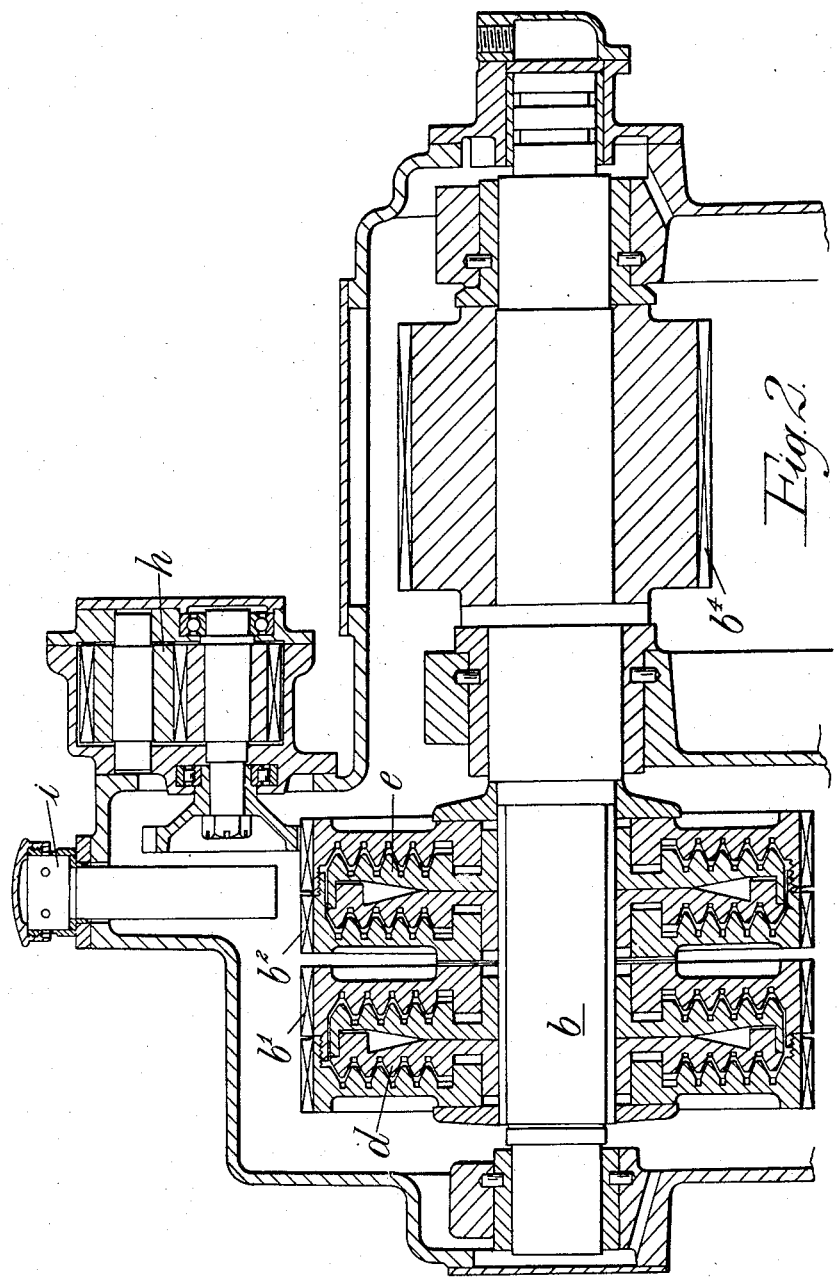
Figure 2 is a section on the line 2—2 of Figure 1.

When such pressure fluid operated clutches are employed the transmission may be adapted to drive one or more oil pumps $h$ (Figure 2) for supplying the required oil or other fluid under pressure or in transmissions wherein other than fluid operated clutches or couplings are used, such pressure oil may be used for lubrication. Pressure fluid for any of the above purposes may also be obtained from any other suitable source and if desired I may incorporate a filter $i$ in the pressure fluid circuit.

The system in accordance with the invention is peculiarly suited to ship propulsion, in which case the output shaft would be provided with a suitable thrust bearing to take any axial load imposed upon the shaft in either direction but it will be understood that transmission gear in accordance with the invention may be applied quite generally for railway and/or road traction and for all other industrial purposes.

I claim:

1. In a power transmission mechanism, the combination of an input shaft; an ahead pinion and an astern pinion co-axially fixed on said shaft; a plurality of intermediate shafts, each of said intermediate shafts having loose thereon co-axial ahead and astern pinions which are drivenly connected, respectively, with said pinions on the input shaft; a pressure-fluid operated clutch within each of said last mentioned pinions for drivingly connecting said last mentioned pinions and said intermediate shafts, by which the desired direction of drive may be selected; and an output shaft driven directly by each of said intermediate shafts.

2. Reversing gear of the kind referred to comprising an input shaft with ahead and astern pinions fast thereon, a plurality of intermediate shafts each having ahead and astern pinions mounted for rotation thereon, clutch means associated with each ahead and astern pinion on the intermediate shafts for selectively connecting one or other or neither of the said pinions in each pair of pinions to the respective intermediate shafts, the one pinion of each pair of pinions engaging directly one of the pinions on the input shaft, an idler gear wheel engaging the other pinion of each pair of pinions on the intermediate shafts and the other pinion on the input shaft, and an output shaft driven directly from each of the intermediate shafts.

3. Reversing gear of the kind referred to comprising an input shaft with ahead and astern pinions fast thereon, a plurality of intermediate shafts each having ahead and astern pinions mounted for rotation thereon, a pressure fluid operated clutch within each of said last mentioned pinions for selectively connecting one or other or neither of the said pinions in each pair of pinions to the respective intermediate shafts, the one pinion of each pair of pinions engaging directly one of the pinions on the input shaft, an idler gear wheel engaging the other pinion of each pair of pinions on the intermediate shafts and the other pinion on the input shaft, and an output shaft driven directly from each of the intermediate shafts.

4. Power transmission mechanism according to claim 3 further characterised by a pump driven by the transmission for supplying pressure fluid for operation of the clutches.

THOMAS HINDMARCH.

REFERENCES CITED

The following references are of record in the file of this patent:

UNITED STATES PATENTS

| Number | Name | Date |
|---|---|---|
| 1,077,519 | Gatta | Nov. 4, 1913 |
| 1,151,762 | Day | Aug. 31, 1915 |
| 1,898,198 | Lysholm | Feb. 21, 1933 |
| 2,311,597 | Schmitter | Feb. 16, 1943 |
| 2,366,172 | Bohn | Jan. 2, 1945 |

FOREIGN PATENTS

| Number | Country | Date |
|---|---|---|
| 113,099 | Germany | Sept. 8, 1900 |
| 398,817 | Germany | July 15, 1924 |
| 423,850 | Germany | Jan. 13, 1926 |
| 540,718 | Great Britain | Oct. 27, 1941 |
| 577,438 | Great Britain | May 17, 1946 |
| 587,252 | Great Britain | Apr. 18, 1947 |
| 599,887 | Great Britain | Mar. 23, 1948 |